US009859948B2

(12) United States Patent
Yasutake et al.

(10) Patent No.: US 9,859,948 B2
(45) Date of Patent: Jan. 2, 2018

(54) SPREAD SPECTRUM COMMUNICATION DEVICE

(71) Applicant: Murata Manufacturing Co., Ltd., Nagaokakyo-shi, Kyoto-fu (JP)

(72) Inventors: Makoto Yasutake, Nagaokakyo (JP); Atsuyuki Yuasa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/788,918

(22) Filed: Jul. 1, 2015

(65) Prior Publication Data
US 2015/0303987 A1  Oct. 22, 2015

Related U.S. Application Data

(63) Continuation of application No. PCT/JP2013/081738, filed on Nov. 26, 2013.

(30) Foreign Application Priority Data

Jan. 8, 2013 (JP) .................................. 2013-001010

(51) Int. Cl.
*H04L 27/20* (2006.01)
*H04B 1/69* (2011.01)
(Continued)

(52) U.S. Cl.
CPC .............. *H04B 1/69* (2013.01); *H04B 1/02* (2013.01); *H04B 1/707* (2013.01); *H04L 27/20* (2013.01);
(Continued)

(58) Field of Classification Search
CPC ................................ H04B 1/707; H04L 27/20
See application file for complete search history.

(56) References Cited

U.S. PATENT DOCUMENTS 5,017,893 A      5/1991   Izumi et al.
5,157,408 A  *  10/1992   Wagner ..................... G01S 1/48
                                                                342/399
(Continued)

FOREIGN PATENT DOCUMENTS

CA     2021749 A1 *  3/1991
JP     03-091342 A    4/1991
(Continued)

OTHER PUBLICATIONS

Official Communication issued in International Patent Application No. PCT/JP2013/081738, dated Jan. 28, 2014.
(Continued)

*Primary Examiner* — Jaison Joseph
(74) *Attorney, Agent, or Firm* — Keating & Bennett, LLP

(57) ABSTRACT

A microprocessor includes a memory, an input/output port and a switch controller. Transmission data, a spread code and an inverted code are stored in the memory. The switch controller generates a spread spectrum signal by calling up either of the spread code or the inverted code in accordance with a bit of the transmission data. A switch connected to the input/output port is switched on and off based on the spread spectrum signal. In addition, an antenna is connected to the input/output port via a coupler. An oscillation circuit includes a reference oscillator and a BPF and inputs a harmonic of a reference signal to the coupler as a carrier wave.

18 Claims, 3 Drawing Sheets

(51) Int. Cl.
*H04B 1/707* (2011.01)
*H04B 1/02* (2006.01)
*H04L 27/00* (2006.01)

(52) U.S. Cl.
CPC .. *H04L 27/2035* (2013.01); *H04L 2027/0018* (2013.01); *H04L 2027/0051* (2013.01); *H04L 2027/0083* (2013.01)

(56) References Cited

U.S. PATENT DOCUMENTS

| | | | |
|---|---|---|---|
| 5,539,770 A | | 7/1996 | Ishigaki |
| 6,853,675 B1 * | | 2/2005 | Oleynik ................ H04W 52/58 |
| | | | 370/342 |
| 7,123,182 B1 * | | 10/2006 | Childs ....................... G01S 7/38 |
| | | | 342/14 |
| 8,952,764 B2 * | | 2/2015 | Hansen .................... H03K 7/00 |
| | | | 332/103 |
| 2004/0017841 A1 * | | 1/2004 | Siwiak ................. H04B 1/7163 |
| | | | 375/146 |
| 2004/0095198 A1 * | | 5/2004 | Yeh ....................... H03B 5/1243 |
| | | | 331/117 R |
| 2005/0090274 A1 * | | 4/2005 | Miyashita ............ H03G 3/3042 |
| | | | 455/502 |
| 2010/0208844 A1 | | 8/2010 | Uhl et al. |

FOREIGN PATENT DOCUMENTS

| | | |
|---|---|---|
| JP | 07-143031 A | 6/1995 |
| JP | 2000-151464 A | 5/2000 |
| JP | 2011-130103 A | 6/2011 |
| WO | 2004/015883 A1 | 2/2004 |

OTHER PUBLICATIONS

Official Communication issued in corresponding European Patent Application No. 13870585.0 dated Jul. 19, 2016.

* cited by examiner

SPREAD SPECTRUM COMMUNICATION DEVICE

BACKGROUND OF THE INVENTION

1. Field of the Invention

The present invention relates to a spread spectrum communication device that transmits a Binary Phase Shift Keying ("BPSK") signal that has undergone spectrum spreading.

2. Description of the Related Art

A spread spectrum communication device is known that generates a transmission wave by performing an exclusive OR (XOR) operation on transmission data and a spread code (PN code) and mixing the result of this operation and a carrier wave (carrier signal) (for example, refer to Japanese Unexamined Patent Application Publication No. 2000-151464).

The spread spectrum communication device described in Japanese Unexamined Patent Application Publication No. 2000-151464 includes a dedicated IC for generating the transmission wave, and for example, a PN code generating circuit that generates a plurality of types of spread codes, and a BPSK modulation circuit that performs BPSK modulation, are mounted inside the dedicated IC. Consequently, along with the circuit configuration inside the dedicated IC being complicated and the manufacturing cost being high, there is a tendency for the size of the device as a whole to be large.

SUMMARY OF THE INVENTION

Preferred embodiments of the present invention provide a spread spectrum communication device that is capable of transmitting a BPSK signal that has undergone spectrum spreading using a simple configuration.

A spread spectrum communication device according to a preferred embodiment of the present invention includes a memory that stores transmission data, a microprocessor that calculates a spread spectrum signal based on the transmission data and that switches an input/output port on and off based on the calculation result, an antenna that is connected to the input/output port via a coupling circuit, and an oscillation circuit that is connected to the coupling circuit and generates a carrier wave. As a result of the microprocessor switching the input/output port on and off based on the calculation result of the spread spectrum signal, a terminal phase of the antenna is inverted by 180° and a BPSK signal that has undergone spectrum spreading is transmitted from the antenna.

According to a preferred embodiment of the present invention, the microprocessor calculates a spread spectrum signal based on transmission data stored in the memory and switches the input/output port on and off based on the result of this calculation. At this time, since the antenna is connected to the input/output port of the microprocessor via the coupling circuit, a terminal phase of the antenna is inverted by 180° in accordance with the switching on and off of the input/output port. Thus, a carrier wave input to the coupling circuit is subjected to BPSK modulation and as a result, a BPSK signal that has undergone spectrum spreading is generated and transmitted from the antenna. Furthermore, the spectrum spreading and BPSK modulation preferably is performed by a general purpose microprocessor and a simple coupling circuit and therefore the circuit configuration is greatly simplified. Consequently, the manufacturing cost is significantly reduced and the device as whole is able to be significantly reduced in size.

In a preferred embodiment of the present invention, the oscillation circuit includes a reference oscillator that outputs a reference signal of the microprocessor and a filter that is connected to the reference oscillator, and the filter extracts a harmonic signal of the reference signal as the carrier wave.

According to a preferred embodiment of the present invention, since a band-limiting filter is connected to the reference oscillator, a multiplied wave of the reference signal is used as the carrier wave by extracting a harmonic signal of the reference signal by using the band-limiting filter. In addition, since the reference signal is a clock signal of the microprocessor, the spread spectrum signal and the carrier wave are easily synchronized without the use of a separate synchronizer by using a multiplied wave of the reference signal as the carrier wave. Consequently, a BPSK signal is generated with certainty without generation of a phase shift even when the carrier wave is subjected to BPSK modulation.

In a preferred embodiment of the present invention, the microprocessor has the reference oscillator built thereinto and includes a reference signal output port that outputs the reference signal, and the filter is connected to the reference signal output port and generates the carrier wave by filtering the reference signal.

According to a preferred embodiment of the present invention, since the reference oscillator is built into the microprocessor, the carrier wave is generated by using the reference signal generated inside the microprocessor. Therefore, there is no need to separately provide an oscillator and the manufacturing cost is significantly reduced.

In a preferred embodiment of the present invention, a spread code and a corresponding inverted code that have been calculated in advance are stored in the memory, and the microprocessor calls up either the spread code or the corresponding inverted code as the calculation result in accordance with a bit of the transmission data.

According to a preferred embodiment of the present invention, since the spread code and the corresponding inverted code are stored in the memory, the microprocessor calls up the spread code when a bit of the transmission data is "1" and calls up the inverted code when a bit of the transmission data is "0". Thus, since the transmission data is subjected to spectrum spreading, an XOR operation or the like to generate a spread spectrum signal is omitted. As a result, a low-specification microprocessor is able to be used, and the manufacturing cost and power consumption are significantly reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
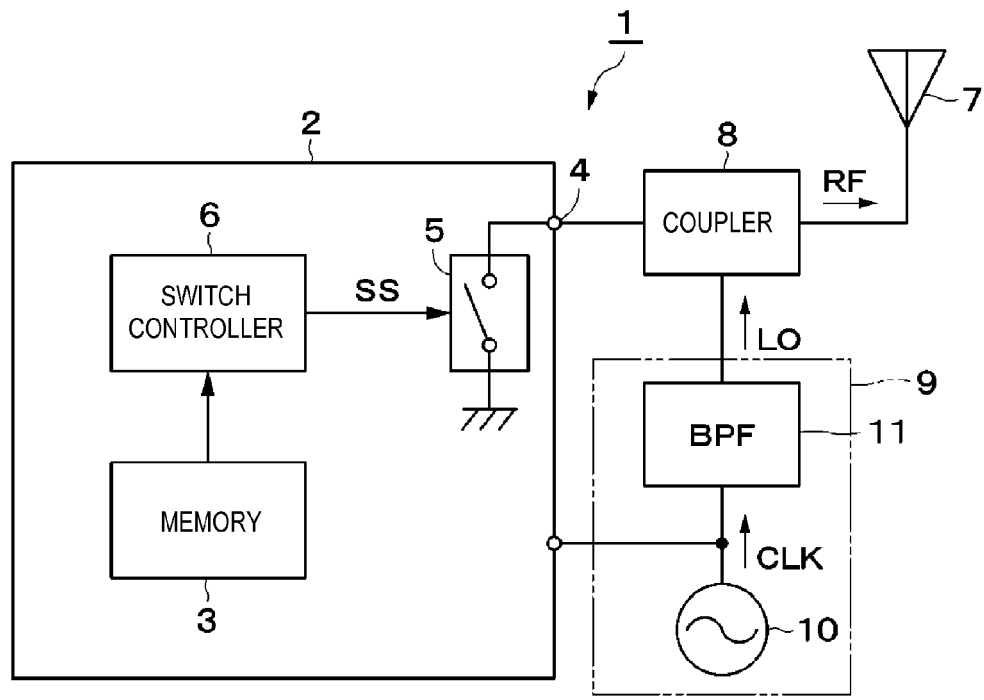
FIG. 1 is a circuit diagram that illustrates a spread spectrum communication device according to a first preferred embodiment of the present invention.

Hereafter, spread spectrum communication devices according to preferred embodiments of the present invention will be described in detail while referring to the drawings.

A spread spectrum communication device 1 (hereafter, communication device 1) according to a first preferred embodiment of the present invention is illustrated in FIG. 1. The communication device 1 includes, for example, a microprocessor 2, an antenna 7, a coupler 8 and an oscillation circuit 9.

The microprocessor 2 preferably is, for example, a general purpose processing device that is capable of performing various signal processing operations and operates in accordance with a reference signal CLK (clock signal) from a reference oscillator 10, which will be described later. The microprocessor includes a memory 3, an input/output port 4 and a switch controller 6.

The memory 3 preferably is, for example, a storage circuit such as a RAM or a ROM. Transmission data D such as user data is stored in the memory 3. In addition, a spread code SC including a certain number of bits determined in advance (for example, 1023 bits) and an inverted code ISC obtained by inverting the spread code are stored in the memory 3. At this time, the user data, for example, corresponds to an individual identification signal (ID) to the communication device 1 and input data from a peripheral device connected to the microprocessor 2. The number of bits of the spread code SC is not limited to the exemplified value and is appropriately set in accordance with the specifications. Furthermore, the memory 3 is provided inside the microprocessor 2, but may instead be provided outside the microprocessor 2.

The input/output port 4 preferably is, for example, a general purpose port such as a GPIO and performs input or output of signals between the microprocessor 2 and the outside and is connected to ground via a switch 5. Accordingly, the input/output port 4 is switched between being short circuited (shorted) and opened (open) in accordance with on/off of the switch 5.

The switch 5 is provided inside the microprocessor 2, but may instead be provided outside the microprocessor 2. In the case where the switch is provided outside the microprocessor 2, the switch preferably is, for example, a MOSFET having a fast response such that high frequency characteristics are improved.

The switch controller 6 preferably is realized by communication control processing of the microprocessor 2. Specifically, when the microprocessor 2 receives a communication initiation request, the switch controller 6 reads out the transmission data D from the memory 3 and determines whether the state of each bit of the transmission data D in a direction from a high-order bit to a low-order bit is "1" or "0". Then, when a bit is "1", the spread code SC stored in the memory 3 is read out and the switch 5 is switched on and off in accordance with the spread code SC. On the other hand, when a bit is "0", the inverted code ISC stored in the memory 3 is read out and the switch 5 is switched on and off in accordance with the inverted code ISC.

Thus, the switch controller 6 calculates a spread spectrum signal SS, which is obtained by subjecting the transmission data D to spectrum spreading, as a modulation signal and switches the input/output port 4 on and off in accordance with the result of this calculation.

The switch controller 6 appends a pilot signal including data of a certain number of bits determined in advance to the front of the spread spectrum signal SS such that the front of the spread spectrum signal SS will be able to be grasped on the reception side. Accordingly, the switch controller 6 switches the input/output port 4 on and off in accordance with the pilot signal.

The antenna 7 is connected to the input/output port 4 via the coupler 8. The antenna 7 may be, for example, various types of antenna such as a dipole antenna, a monopole antenna, a patch antenna or a helical antenna and transmits a high-frequency transmission signal RF, which will be described later.

Figure 2:
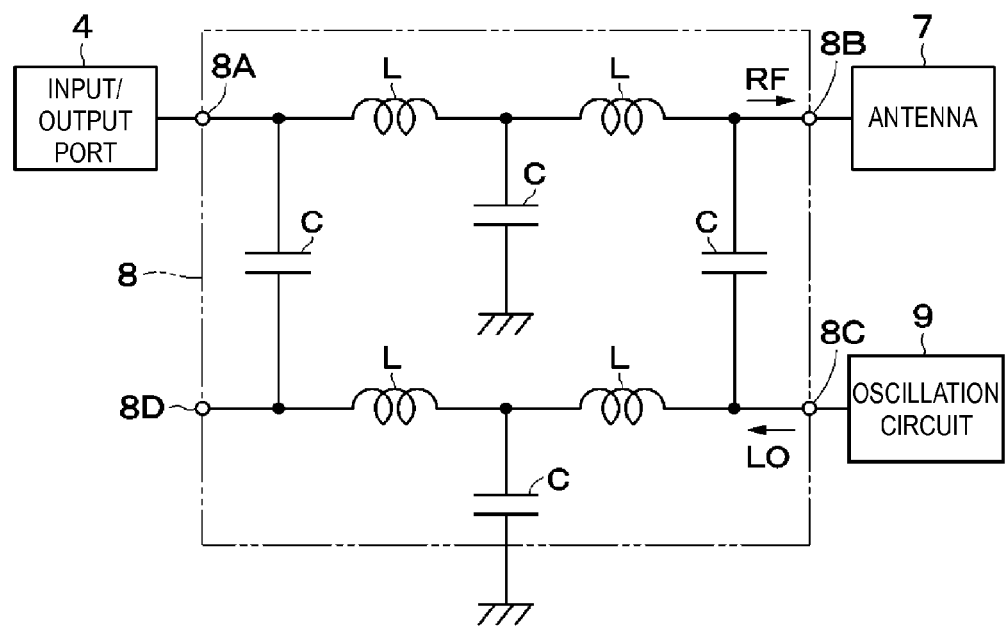
FIG. 2 is a circuit diagram that illustrates an example of coupler.

The coupler 8 preferably is a coupling circuit that subjects a carrier wave LO to BPSK modulation based on the spread spectrum signal SS. The coupler 8 may be a coupler designed with a distributed constant such as a directional coupler including a microstrip line or may be a coupler designed with a lumped constant. In FIG. 2, the coupler 8 including general use inductors L and capacitors C without using a special component is exemplified but in no way limiting. For a directional coupler including a four terminal circuit illustrated in FIG. 2, the input/output port 4, the antenna 7 and the oscillation circuit 9 are respectively connected to three terminals 8A, 8B and 8C. Furthermore, a reflected wave from the antenna 7 is output to the remaining one terminal 8D. Consequently, it is desirable that for example a terminating resistor be connected to the terminal 8D to realize reflection-free termination.

Since the input/output port 4 is switched between shorted and open in accordance with the spread spectrum signal SS, the terminal phase of the antenna 7 is accordingly inverted by 180°. Thus, the transmission signal RF is generated by the carrier wave LO being subjected to BPSK modulation based on the spread spectrum signal SS, and is transmitted to the outside from the antenna 7.

The oscillation circuit 9 preferably includes the reference oscillator 10 and a band pass filter 11 (hereafter BPF 11). The reference oscillator 10 preferably is a crystal oscillator, for example, and outputs a reference signal CLK of a certain predetermined frequency (for example around several tens of MHz to several hundreds of MHz) as a clock signal of the microprocessor 2. The reference oscillator 10 is appropriately selected in accordance with the performance of the receiver.

On the other hand, the BPF 11 extracts an nth order harmonic signal of the reference signal CLK as the carrier wave LO. The order of the harmonic is determined by the frequency of the carrier wave LO. An output terminal of the BPF 11 is connected to the coupler 8. Thus, the carrier wave LO is subjected to BPSK modulation by the coupler 8 and supplied to the antenna 7.

Figure 3:
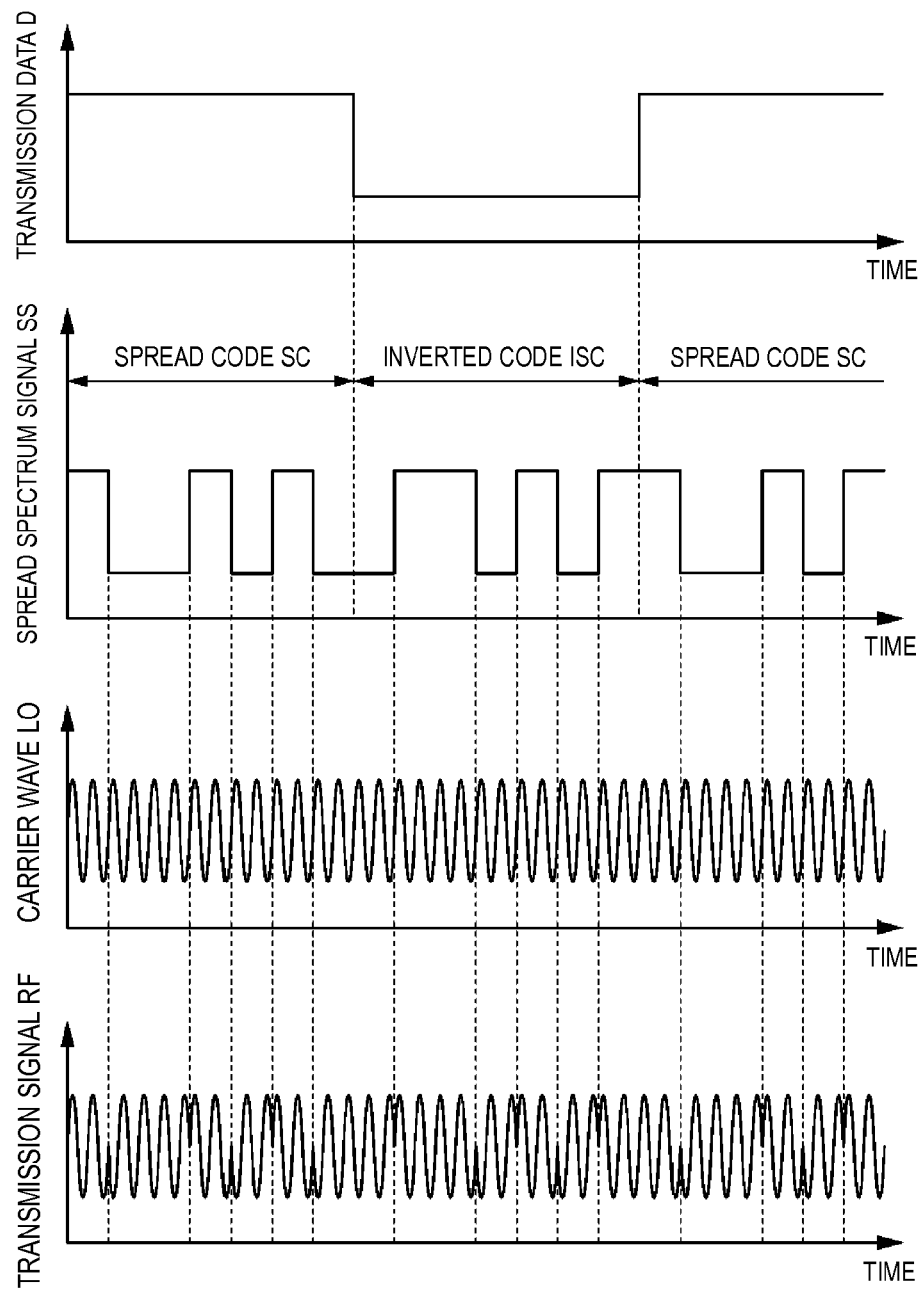
FIG. 3 is a characteristics line diagram that illustrates changes that occur in transmission data, a spread spectrum signal, a carrier wave and a transmission signal with time.

The communication device 1 according to this preferred embodiment is preferably configured as described above and next the operation thereof will be described while referring to FIGS. 1 to 4. For convenience of explanation, for example, the number of bits of the spread code SC and the frequency of the carrier wave LO have been simplified and the waveforms illustrated in FIG. 3 are different than the actual waveforms.

The microprocessor 2 calculates the spread spectrum signal SS based on the transmission data D stored in the memory 3. Specifically, the switch controller 6 of the microprocessor 2 calls up the spread code SC from the memory 3 when a bit of the transmission data D is "1" and calls up the inverted code ISC from the memory 3 when a bit of the transmission data D is "0". In this way, the spread spectrum signal SS is generated based on the transmission data D as illustrated in FIG. 3. The switch controller 6 switches the switch 5 on and off and switches the input/output port 4 on (shorted) and off (open) based on the result of the calculation of the spread spectrum signal SS.

At this time, since the antenna 7 is connected to the input/output port 4 of the microprocessor 2 via the coupler 8, a terminal impedance of the antenna 7 changes in accordance with on/off of the input/output port 4. Consequently, the terminal phase of the antenna 7 is inverted by 180° and the phase of the transmission signal RF radiated from the antenna 7 also changes by 180°. As a result, since the carrier wave LO undergoes BPSK modulation based on the spread spectrum signal SS, a BPSK signal that has undergone spectrum spreading is generated as the transmission signal RF and transmitted from the antenna 7.

In addition, the switch controller 6 switches the switch 5 on and off in accordance with the spread spectrum signal SS, which was obtained by subjecting the transmission data D to spreading in advance, and therefore a BPSK signal that has undergone spectrum spreading at a time is obtained through this switching operation. As a result, spectrum spreading and BPSK modulation is performed using the general purpose microprocessor 2 and the simple coupler 8 substantially without the use of a special component for high-frequency use and therefore the circuit configuration is simplified. Consequently, the manufacturing cost is significantly reduced and the device as whole is significantly reduced in size.

In addition, since the BPF 11 is connected to the reference oscillator 10, a harmonic signal of the reference signal CLK is read out by the BPF 11 and as a result a multiplied wave of the reference signal CLK is used as the carrier wave LO. In addition, since the reference signal CLK is a clock signal of the microprocessor 2, a multiplied wave of the reference signal CLK is used as the carrier wave LO and as a result the spread spectrum signal SS and the carrier wave LO is easily synchronized without using a separate synchronizer.

Figure 4:
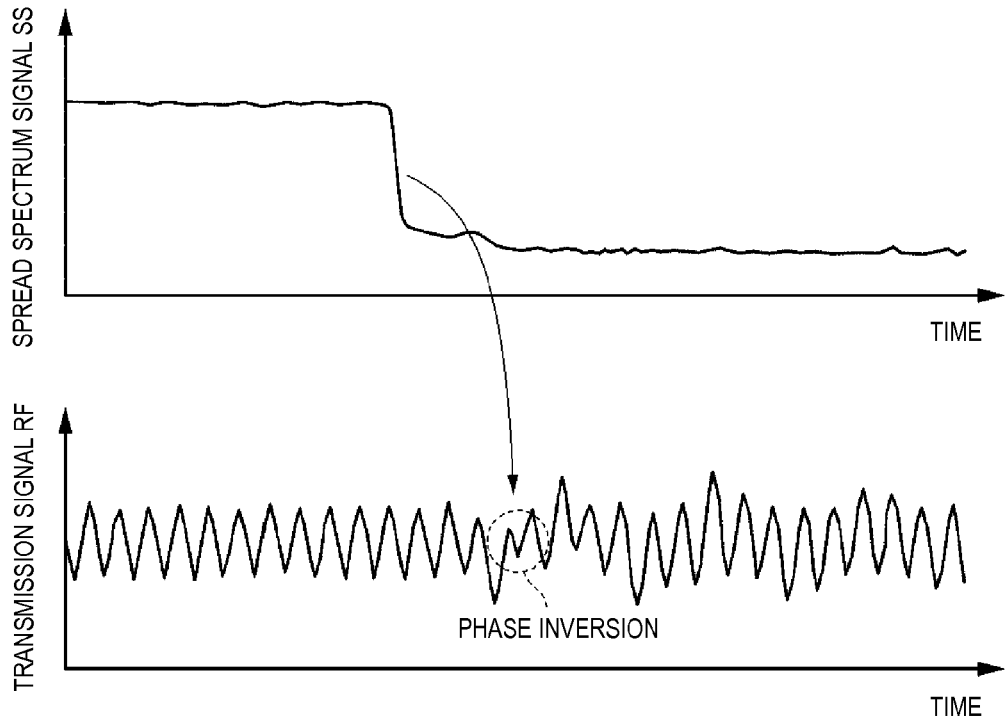
FIG. 4 is a characteristics line diagram that illustrates a state in which a transmission signal undergoes phase inversion based on a spread spectrum signal.

In order to confirm this effect, the waveform of a BPSK signal (transmission signal RF) generated when a spread spectrum signal SS was being switched was actually measured. The results are illustrated in FIG. 4. FIG. 4 illustrates a waveform obtained when the frequency of the carrier wave LO was 150 MHz and the modulation rate was set to 1 MHz, for example.

As illustrated in FIG. 4, when the spread spectrum signal SS switches between "1" (High) and "0" (Low), the phase of the transmission signal RF, which is a BPSK signal, is inverted. At this time, a toggle point (transition point) of the BPSK signal does not change and is fixed or substantially fixed. Consequently, a BPSK signal is generated with certainty without generation of a phase shift even when the carrier wave LO is subjected to BPSK modulation. As a result, the BPSK signal is easily demodulated on the reception side and the configuration of the reception side is simplified.

In addition, since the spread code SC and the corresponding inverted code ISC are stored in the memory 3, the microprocessor 2 calls up the spread code SC when a bit of the transmission data D is "1" and calls up the inverted code ISC when a bit of the transmission data D is "0". Thus, since the transmission data D is subjected to spectrum spreading, an XOR operation or the like to generate a spread spectrum signal SS is able to be omitted. As a result, a low-specification microprocessor 2 is able to be used, and the manufacturing cost and power consumption are significantly reduced.

Figure 5:
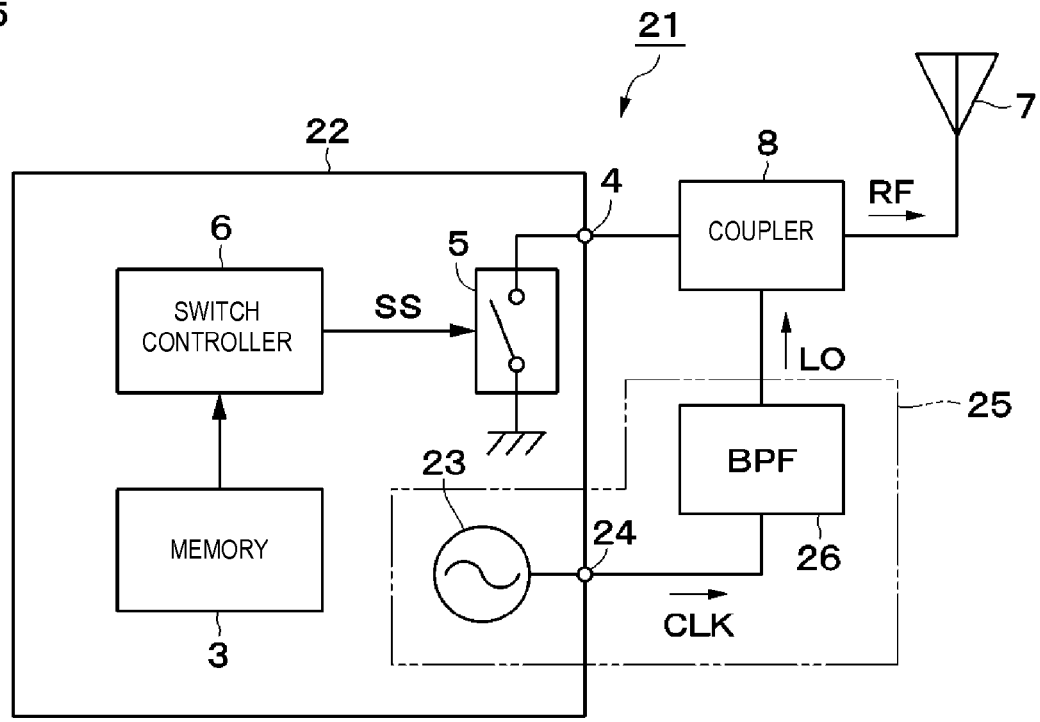
FIG. 5 is a circuit diagram that illustrates a spread spectrum communication device according to a second preferred embodiment of the present invention.

Next, a second preferred embodiment of the present invention is illustrated in FIG. 5. A characteristic of the second preferred embodiment is that the microprocessor preferably includes a reference oscillator built thereinto. In the second preferred embodiment, constituent elements that are the same as those in the above-described first preferred embodiment will be denoted by the same symbols and description thereof will be omitted.

A spread spectrum communication device 21 (hereafter, communication device 21) according to the second preferred embodiment includes for example a microprocessor 22, an antenna 7, a coupler 8 and an oscillation circuit 25, substantially the same as the communication device 1 according to the first preferred embodiment.

Here, the microprocessor 22 includes a reference oscillator 23 and a reference signal output port 24, in addition to a memory 3, an input/output port 4 and a switch controller 6. The reference oscillator 23 preferably defines an oscillation circuit 25 together with a band pass filter 26 (hereafter, BPF 26), which will be described later. The reference oscillator 23 outputs a reference signal CLK of a certain frequency as a clock signal of the microprocessor 22, which is the same or substantially the same as the reference oscillator 10 according to the first preferred embodiment. The reference signal CLK is output from the reference signal output port 24.

The BPF 26 preferably has the same or substantially the same configuration as the BPF 11 according to the first preferred embodiment and extracts an nth order harmonic signal of the reference signal CLK as a carrier wave LO. At this time, an input terminal of the BPF 26 is connected to the reference signal output port 24 of the microprocessor 22 and an output terminal of the BPF 26 is connected to the coupler 8. Thus, the carrier wave LO undergoes BPSK modulation and is supplied to the antenna 7.

Thus, the same effect preferably is obtained with the second preferred embodiment as with the first preferred embodiment. In addition, since the reference oscillator 23 is built into the microprocessor 22, the microprocessor 22 generates the carrier wave LO by using the reference signal CLK generated inside the microprocessor 22. Therefore, there is no need to separately provide an oscillator and the manufacturing cost is significantly reduced.

In the above-described preferred embodiments, the reference oscillators 10 and 23 of the oscillation circuits 9 and 25 preferably output a reference signal that is a clock signal of the microprocessors 2 and 22. However, the present invention is not limited to this and an oscillator may be used in the oscillation circuit that outputs a signal separate from the clock signal of the microprocessor. In this case, although a circuit or device to obtaining synchronization between the spread spectrum signal and the carrier wave is necessary, the frequency, the output voltage and so forth of the carrier wave is able to be set independently of the microprocessor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A spread spectrum communication device, comprising:
a memory that stores transmission data;

a microprocessor that calculates a spread spectrum signal based on the transmission data and that switches an input/output port on and off based on a calculation result of the spread spectrum signal;

an antenna that is connected to the input/output port via a coupling circuit;

an oscillation circuit that is connected to the coupling circuit and generates a carrier wave; and a coupler that connects the antenna to the input/output port; wherein the microprocessor switches the input/output port on and off based on the calculation result of the spread spectrum signal to cause a terminal phase of the antenna to be inverted by 180°;

the coupler is a coupling circuit that subjects the carrier wave to BPSK modulation based on the spread spectrum signal, to generate a transmission signal;

the transmission signal, including the carrier wave subjected to BPSK modulation, is transmitted from the antenna;

the oscillation circuit includes a reference oscillator that outputs a reference signal of the microprocessor and a filter that is connected to the reference oscillator; and the filter extracts a harmonic signal of the reference signal as the carrier wave.

2. The spread spectrum communication device according to claim 1, wherein the reference oscillator is built into microprocessor;

the microprocessor includes a reference signal output port that outputs the reference signal; and the filter is connected to the reference signal output port and generates the carrier wave by filtering the reference signal.

3. The spread spectrum communication device according to claim 1, wherein a spread code and a corresponding inverted code that have been calculated in advance are stored in the memory; and the microprocessor calls up either the spread code or the corresponding inverted code as the calculation result in accordance with a bit of the transmission data.

4. The spread spectrum communication device according to claim 1, wherein the memory is provided inside of the microprocessor.

5. The spread spectrum communication device according to claim 1, wherein the memory is provided outside of the microprocessor.

6. The spread spectrum communication device according to claim 1, wherein a spread code and an inverted code are stored in the memory.

7. The spread spectrum communication device according to claim 1, further comprising a switch that opens or shorts the input/output port.

8. The spread spectrum communication device according to claim 7, wherein the switch is provided inside of the microprocessor.

9. The spread spectrum communication device according to claim 7, wherein the switch is provided outside of the microprocessor.

10. The spread spectrum communication device according to claim 9, wherein the switch is a MOSFET.

11. The spread spectrum communication device according to claim 1, wherein the antenna is one of a dipole antenna, a monopole antenna, a patch antenna, and a helical antenna.

12. The spread spectrum communication device according to claim 1, wherein the coupler has one of a distributed constant and a lumped constant.

13. The spread spectrum communication device according to claim 1, wherein the coupler includes one of a microstrip line, and inductors and capacitors.

14. The spread spectrum communication device according to claim 1, wherein a reference oscillator is built into the microprocessor.

15. The spread spectrum communication device according to claim 14, wherein the reference oscillator is configured to output the reference signal that is a clock signal of the microprocessor.

16. The spread spectrum communication device according to claim 14, wherein the reference oscillator is configured to output the reference signal that is separate from a clock signal of the microprocessor.

17. The spread spectrum communication device according to claim 1, wherein the filter is a band pass filter.

18. The spread spectrum communication device according to claim 1, wherein the carrier wave is a multiplied wave of the reference signal.

* * * * *